No. 720,631. PATENTED FEB. 17, 1903.
W. R. SMITH.
VULCANIZING APPARATUS.
APPLICATION FILED FEB. 6, 1902.
NO MODEL. 2 SHEETS—SHEET 1.
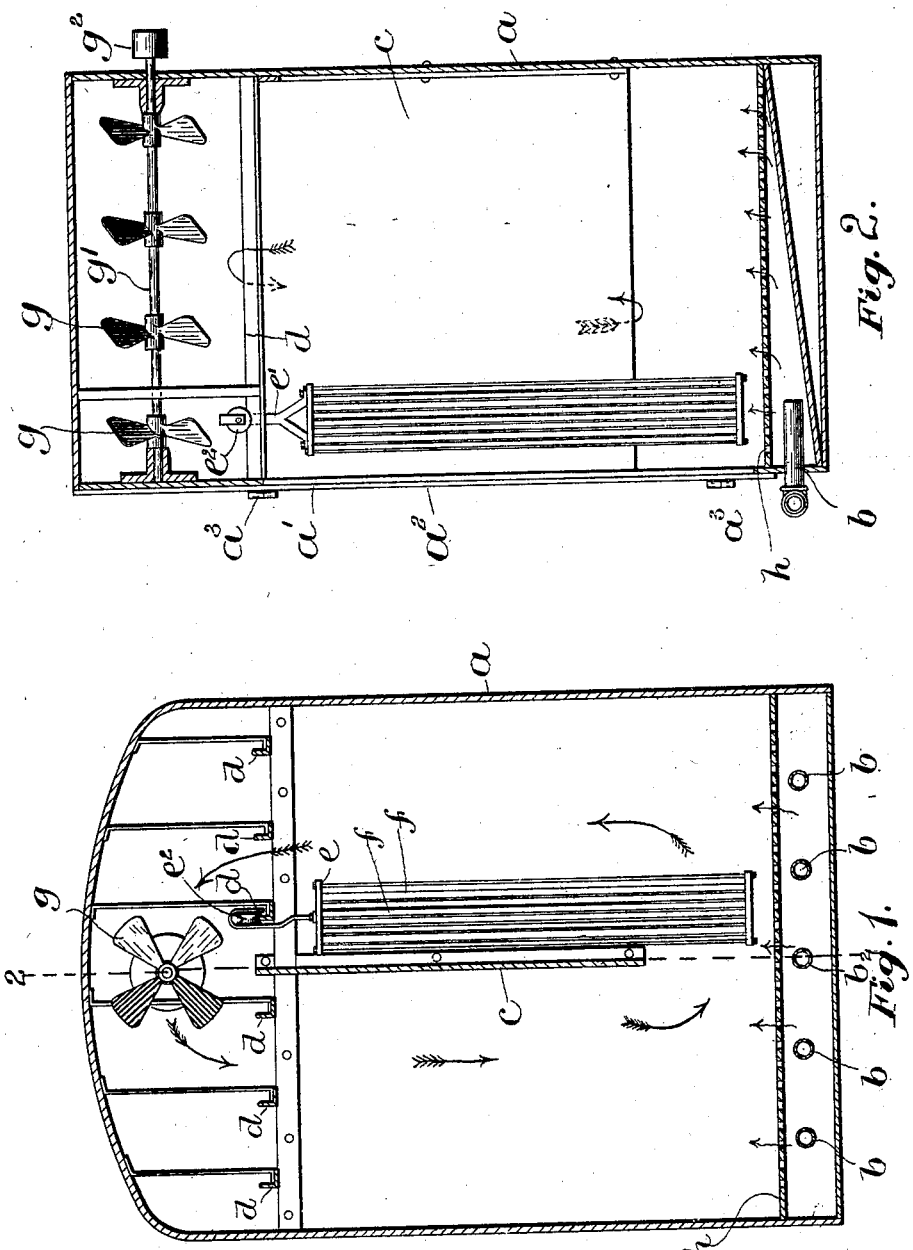

No. 720,631. PATENTED FEB. 17, 1903.
W. R. SMITH.
VULCANIZING APPARATUS.
APPLICATION FILED FEB. 6, 1902.
NO MODEL. 2 SHEETS—SHEET 2.
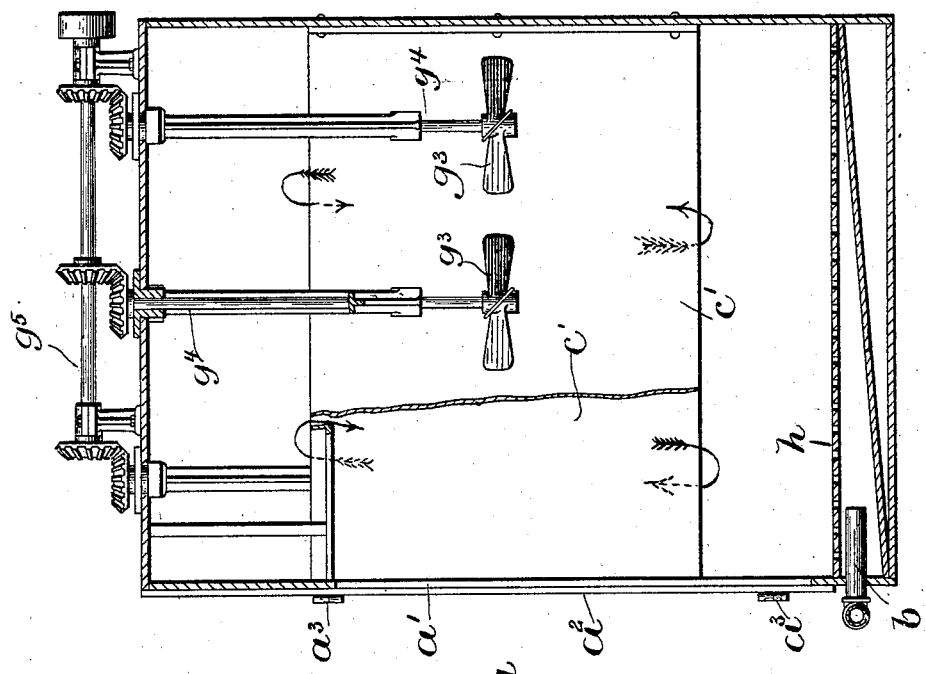
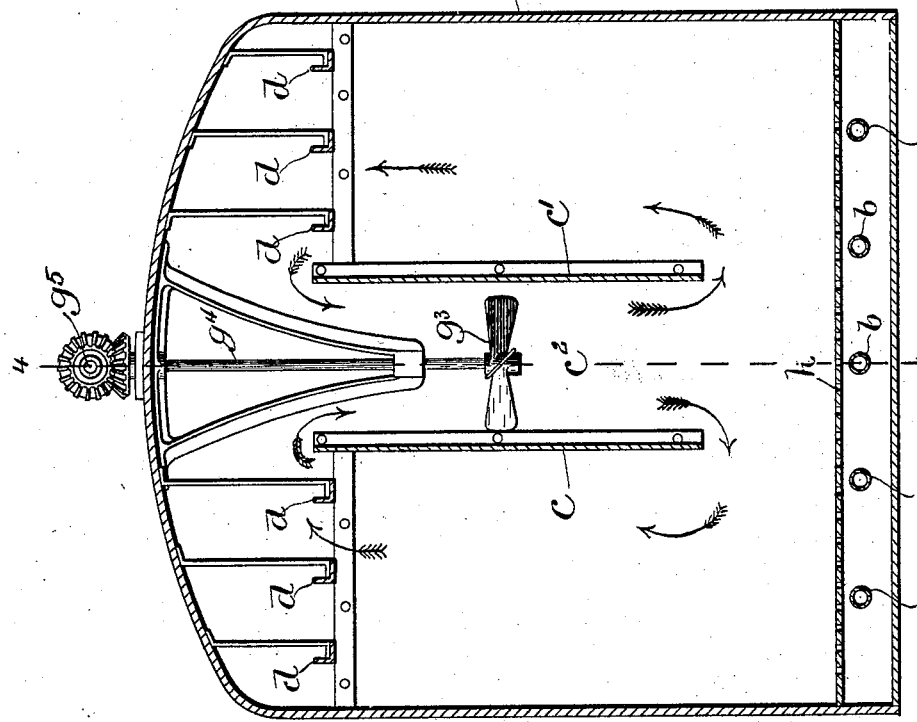
Witnesses:
Inventor:

UNITED STATES PATENT OFFICE.

WILLIAM R. SMITH, OF BOSTON, MASSACHUSETTS, ASSIGNOR TO CLIFTON MANUFACTURING COMPANY, A CORPORATION OF NEW JERSEY.

VULCANIZING APPARATUS.

SPECIFICATION forming part of Letters Patent No. 720,631, dated February 17, 1903.

Application filed February 6, 1902. Serial No. 92,875. (No model.)

*To all whom it may concern:*

Be it known that I, WILLIAM R. SMITH, of Boston, in the county of Suffolk and State of Massachusetts, have invented certain new and useful Improvements in Vulcanizing Apparatus, of which the following is a specification.

This invention has for its object to provide an apparatus for conveniently holding and subjecting to a vulcanizing heat elongated articles, such as lengths of tubing coated externally or internally or both externally and internally, with a vulcanizable insulating composition.

The invention consists in the improved apparatus which I will now proceed to describe and claim.

Of the accompanying drawings, forming a part of this specification, Figure 1 represents a transverse vertical section of an apparatus embodying my invention. Fig. 2 represents a section on line 2 2 of Fig. 1. Fig. 3 represents a view similar to Fig. 1, showing a different arrangement of the air-circulating means. Fig. 4 represents a section on line 4 4 of Fig. 3.

The same letters of reference indicate the same parts in all the figures.

Referring at present to Figs. 1 and 2, $a$ represents a casing which may be of any suitable construction and is preferably composed of metal plates suitably riveted or welded together, the casing being substantially airtight and free from openings when in use, excepting the openings involved by the employment of the burners $b$ at the lower portion of the casing, these burners delivering gas to the lower portion of the casing, where the gas is burned, the heat rising and being circulated in the casing, as hereinafter described. The casing is partially subdivided longitudinally by means of a partition $c$, which extends from one end of the casing to the other, but does not extend either to the top or bottom of the casing, spaces being left above and below the partition for the circulation of hot air. (Indicated by the arrows in Fig. 1.) In the upper portion of the casing and extending substantially parallel with the partition $c$ are a series of tracks $d$, on which may be supported any desired number of depending carriages $e$, each adapted to hold a number of tubes $f$, the coatings of which are to be vulcanized. The carriages $e$ are preferably provided at their upper ends with arms or yokes $e'$, having trolley-wheels $e^2$, formed to run on the tracks $d$. One end of the casing has an opening $a'$, formed to admit the carriages $e$ and their contents, a suitable door $a^2$ being provided to close said opening, said door being preferably connected to the casing by hinges $a^3$, Fig. 2.

$g\ g$ represent a series of fans mounted upon a shaft $g'$, which is journaled in the upper portion of the casing above the partition $c$. The rotation of the fans $g$, which may be caused by a belt running on a pulley $g^2$ on the shaft $g'$, causes the circulation of air and the heated products of combustion from the burners $b$ in the directions indicated by the arrows. It will be seen, therefore, that when the casing $a$ is charged with tubes or other articles to be vulcanized and the burners $b$ are ignited there will be a continuous circulation of heat along the tubes, the heat rising in the portion of the casing at one side of the partition $c$ and descending in the portion at the opposite side. The heat is therefore fully utilized and distributed over all the articles to be vulcanized. I prefer to interpose a perforated plate $h$ between the burners and the portion of the casing in which the articles $f$ are contained, said plate distributing the heat uniformly.

In Figs. 3 and 4 I show two partitions $c'$ $c'$ instead of the single partition $c$ shown in Figs. 1 and 2. Said partitions $c'$ are separated from each other by a space $c^2$, in which are located a series of fans $g^3$, affixed to vertical shafts $g^4$, which are geared to a single driving-shaft $g^5$. The rotation of the fans $g^3$ causes the formation of two heat-circulating currents, as indicated by the arrows in Fig. 3.

It will be seen that the partition $c$ in Fig. 1 and each of the partitions $c'$ $c'$ in Fig. 3 are surrounded by an endless passage for heated air, each passage including a chamber to contain the articles to be vulcanized. It will also be seen that the fans $g$ in Fig. 1 and the fans $g^3$ in Fig. 3 constitute means for circulating heated air in said passage or passages.

By circulating the heat in the manner described I secure a uniform temperature at all parts of the chamber, so that elongated articles, such as pipes, can be uniformly vulcanized from end to end.

I claim—

1. A vulcanizing apparatus comprising a substantially air-tight casing inclosing an endless passage, including a chamber for the articles to be vulcanized, and means for maintaining a circulation in said passage.

2. A vulcanizing apparatus comprising a substantially air-tight casing inclosing an endless passage including a chamber for the articles to be vulcanized, means for supporting said articles in said chamber, and means for maintaining a circulation in said passage.

3. A vulcanizing apparatus comprising a substantially air-tight casing inclosing an endless passage including a chamber for the articles to be vulcanized, a heater communicating with said passage, and means for maintaining a circulation in the passage.

4. A vulcanizing apparatus comprising a substantially air-tight casing, a partition within the casing extending from end to end of the casing but separated from the top and bottom thereof, whereby an endless passage is formed and means for maintaining a circulation of air in said passage.

5. A vulcanizing apparatus comprising a substantially air-tight casing, two partitions within the casing each extending from end to end of the casing but separated from the top and bottom thereof, and from each other, and air-circulating means located between said partitions.

6. A vulcanizing apparatus comprising a casing, burners near the bottom of the casing, a perforated plate above the burners, the casing being partitioned above the said plate to form an endless passage, and means for circulating air and products of combustion in said passage.

In testimony whereof I have affixed my signature in presence of two witnesses.

WILLIAM R. SMITH.

Witnesses:
C. F. BROWN,
E. BATCHELDER.